United States Patent [19]

Spires

[11] Patent Number: 4,503,289
[45] Date of Patent: Mar. 5, 1985

[54] LINE CIRCUIT WITH FLUX COMPENSATION AND ACTIVE IMPEDANCE TERMINATION

[75] Inventor: Dewayne A. Spires, Plaistow, N.H.

[73] Assignee: AT&T Bell Laboratories, Murray Hill, N.J.

[21] Appl. No.: 458,276

[22] Filed: Jan. 17, 1983

[51] Int. Cl.³ ...................... H04B 1/58; H04F 19/02; H04F 27/42
[52] U.S. Cl. .............................. 179/16 F; 179/18 FA; 179/170 D; 323/356
[58] Field of Search ................... 323/355, 356, 301; 179/16 F, 16 AA, 16 R, 70, 77, 18 FA, 170 D, 170 R

[56] References Cited

U.S. PATENT DOCUMENTS

| 4,096,363 | 6/1978 | Earp | 179/170 R |
| 4,182,936 | 1/1980 | Beirne et al. | 179/18 AH |
| 4,241,239 | 12/1980 | Pernyeszi | 179/18 FA |
| 4,243,842 | 1/1981 | Gibb | 179/18 FA |
| 4,319,093 | 3/1982 | Bars | 179/70 |
| 4,321,431 | 3/1982 | Beirne et al. | 179/18 AH |
| 4,387,273 | 6/1983 | Chea, Jr. | 179/16 F |

OTHER PUBLICATIONS

"A High-Voltage IC for a Transformerless Trunk and Subscriber Line Interface" by D. W. Aull et al., *IEEE Journal of Solid-State Circuits*, vol. SC-16, No. 4, Aug. 1981, pp. 261-266.

Primary Examiner—Thomas W. Brown
Assistant Examiner—Randall Vaas
Attorney, Agent, or Firm—John K. Mullarney

[57] ABSTRACT

A telephone line circuit comprises a transformer that has a primary (13) and a secondary (14) winding. A low resistance (15) is connected in series with the primary winding. An amplifier circuit (17) is coupled across the resistance and serves to develop a predetermined dc control voltage. This control voltage is used to establish a dc current flow in the secondary which is n times that of any dc current flow in the primary, where n is the transformer turns ratio. The dc current flow established in the secondary is in a direction opposite that of the dc current flow in the primary. A second amplifier circuit (31, 36, 23) is coupled across the primary winding and serves to generate an ac control signal which is also delivered to the secondary winding to create a predetermined ac termination impedance.

6 Claims, 1 Drawing Figure

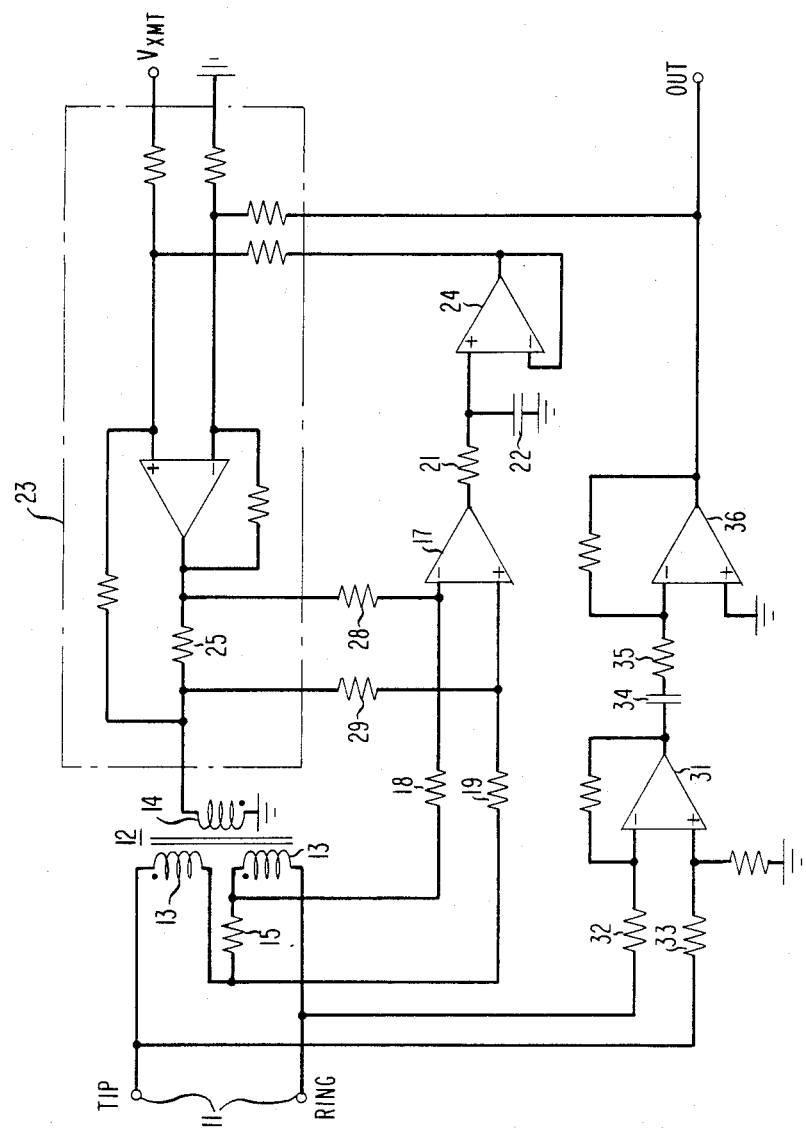

LINE CIRCUIT WITH FLUX COMPENSATION AND ACTIVE IMPEDANCE TERMINATION

TECHNICAL FIELD

The present invention relates to telephone line circuits and, more particularly, to a technique for passing dc current through a winding of a transformer whose core is not capable of sustaining a large amount of net flux. The invention also facilitates the transmission of ac signals in telephone line circuits.

BACKGROUND OF THE INVENTION

In telephone systems it is necessary to provide a low impedance dc connection between a pair of wires (the TIP and RING of a customer loop or trunk) for signaling functions, while simultaneously providing a much larger and well controlled ac impedance for voice frequency transmission. Traditionally, this has been accomplished by using a transformer with a low dc resistance and large inductance. One winding of the transformer provides the dc path and the transformer couples the ac signal to the remainder of the circuit. The large inductance (>2H) assures that the transformer does not significantly shunt the ac signal. The disadvantage of this approach is that the transformer must be physically large so that its core can accommodate the net flux created by the dc current without saturating, while still maintaining a large inductance. A small transformer may be used if the dc is blocked from its winding with a capacitor and a shunt dc path is provided. However, the shunt path must also consist of a large dc carrying inductor or an "electronic" inductor. Electronic inductors are smaller but require an operating voltage that degrades the signaling performance of the circuit.

The U.S. Pat. No. 4,243,842, to W. D. Gibb, issued Jan. 6, 1981, proposes a technique for handling the flux problem discussed above. The patent proposes the addition of a balance winding in the transformer, which is connected in series with one portion of the split primary winding. The balance winding is counter-wound with respect to the primary winding and must contain more turns than the n turns of the primary winding. Not only does the added balance winding result in a transformer more expensive than a conventional transformer, but the manufacturing problems in making transformers with part of the primary winding counter-wound with respect to its other part are considerable. Moreover, the patent to Gibb does not deal with the problem of providing a well controlled ac termination impedance to facilitate voice frequency transmission.

SUMMARY OF THE INVENTION

It is a primary object of the present invention to pass dc current through a winding of a conventional (telephone line circuit) transformer whose core is not capable of sustaining a large amount of net flux.

It is a related object of the invention to provide a well controlled ac termination impedance for voice frequency transmission through a transformer, even though the transformer has relatively large and uncontrolled dc winding resistance.

A telephone line circuit in accordance with the present invention comprises a transformer that has a primary and a secondary winding. A (low) resistance is connected in series with the primary winding. An amplifier circuit is coupled across the resistance and serves to develop a predetermined dc control voltage. This control voltage is used to establish a dc current flow in the secondary which is n times that of any dc current flow in the primary, where n is the transformer turns ratio. The dc current flow in the secondary is in a direction opposite the dc current flow in the primary. A second amplifier circuit is coupled across the primary winding and serves to generate an ac control signal which is also delivered to the secondary to create a proper, predetermined ac termination impedance.

It is a particularly advantageous feature of the present invention that gain and dc offset errors in the (feedback) circuit are automatically corrected for.

BRIEF DESCRIPTION OF THE DRAWING

The single FIGURE is a schematic diagram of a telephone line circuit in accordance with the principles of the present invention.

DETAILED DESCRIPTION

Referring now to the drawing, the telephone line circuit in accordance with the invention is intended for connection between a telephone handset and an associated switching facility via the TIP and RING terminals 11. Alternatively, in time division multiplex systems, the line circuit of the invention may be incorporated in one or more of the channel units of a Channel Bank (such as the standard Bell System D3 or D4 Channel Banks). The line circuit includes a transformer 12 with a split primary winding 13 connected across the TIP and RING terminals 11 and a secondary winding 14. The resistance 15 is connected in series with the primary winding; e.g., it can be connected between the two parts of the split primary winding, as shown. The resistance 15 is of a low value (e.g., 90 ohms) so that the signaling performance of the circuit is maintained.

The telephone line circuit of the invention uses a physically small transformer, without requiring a shunt dc path such as heretofore described. The circuit operates on the principle of canceling the flux in the transformer core. Direct current (dc) is allowed to flow in the primary winding of the transformer. Normally this would saturate the core and ruin the inductance and ac performance of the transformer. However, in accordance with the invention, the net flux in the transformer is kept very small and thus the transformer operates as though no dc current were flowing in the primary winding. Moreover, unlike the arrangement disclosed in the patent to Gibb, supra, a transformer of conventional design can still be utilized; i.e., a standard transformer consisting of only a primary and secondary, without additional balance windings and the like, can be used.

The amplifier 17 meters the current in the primary by measuring the voltage drop across resistance 15. The resistances 18 and 19 should be of a high value (e.g., 400K) to prevent loading on the TIP and RING. Further, as will be evident to those knowledgeable in the telephony art, the operational amplifier 17 (of a conventional design) and its associated resistors should be selected so as not to degrade the common mode capability of the transformer. The output of amplifier 17 is filtered by resistance 21 and capacitance 22 to remove any ac signal. In an integrated circuit embodiment this filter would comprise part of the operational amplifier. The output of the filter is delivered to the transconductance amplifier 23 via the buffer amplifier 24. The transconductance amplifier 23 develops an output current proportional to the voltage input. A transconductance amplifier that can be advantageously utilized for amplifier 23 is shown (FIG. 3) and described in the article, "A High-Voltage IC for a Transformerless Trunk and Subscriber Line Interface" by D. W. Aull et al, *IEEE Journal of Solid-State Circuits*, Vol. SC-16, No. 4, August 1981, pages 261–6.

The output current from the transconductance amplifier establishes a current flow through the secondary which serves to substantially cancel the flux induced in the transformer core by any dc current flow in the primary. Hence, the net flux in the transformer is quite small (within the accuracies of the feedback loop) and the transformer operates as though no dc current were flowing in the primary. More particularly, the output from the transconductance amplifier introduces a dc current flow in the secondary which is n times that of any dc current flow in the primary, where n is the transformer turns ratio (n:1). For example, if the transformer turns ratio is 1:1, the dc current flow in the secondary should be equal to the dc current flow in the primary. In the present embodiment the turns ratio for the transformer of the telephone line circuit is 1.4:1. Therefore, for a net flux approaching zero, the dc current flow in the secondary should be 1.4 times that of the dc current flow in the primary. Moreover, the dc current flow in the secondary must be in a direction opposite that of any dc current flow in the primary.

The current in the secondary 14 also produces a voltage drop across resistance 25, which is coupled back to the input of amplifier 17 via the resistors 28 and 29 (e.g., 186.7K). The resistances 18, 19, 28 and 29 comprise a bridge circuit, with the voltage drop across resistance 15 applied to one side of the bridge and the drop across resistance 25 applied to the other. The circuit operates to create a null at the input to amplifier 17, which is connected across the bridge (mid-point). The value of resistance 25(R25) is given by the equation:

$$R25 = R15 \cdot \frac{R29}{R19} \cdot \frac{1}{n}$$

where n is the transformer turns ratio. The circuit, as well as the null produced thereby, is particularly advantageous in that any gain or dc offset errors in amplifiers 17, 23, 24 or even amplifiers 31 and 36 are automatically corrected for, except for the dc input effect of amplifier 17.

As is known to those in the telephony art, it is important that the telephone line circuit provide the proper terminating impedance (e.g., 900 ohms plus 2.16 µF) for the TIP-RING. This has been done heretofore by designing the transformer to specifically provide the proper impedance. This approach, however, necessitates very stringent or exacting design parameters for the transformer. The proper termination impedance is achieved in accordance with the invention without requiring the aforementioned exacting design parameters.

Voice frequency signals from the TIP-RING are delivered to the balanced operational amplifier 31, of conventional design, via the resistances 32 and 33. The latter resistances should be of a sufficiently high value to prevent loading on the TIP-RING. The output of amplifier 31 is delivered to the unbalanced operational amplifier 36, of conventional design, via the capacitance 34 and resistance 35. The output of amplifier 36 is coupled to the transconductance amplifier 23 to control the ac current delivered to the secondary and thereby provide the proper ac terminating impedance (e.g., 900 ohms plus 2.16 µF) for the TIP-RING. The capacitance 34 serves to block any dc output of amplifier 31. The terminating impedance offered by this telephone line circuit is determined primarily by the values selected for capacitance 34 and resistance 35. Because of the high gain in the feedback path, the values for capacitance 34 and resistance 35 can be considerably scaled down (e.g., C34=0.22 µF and R35=6920 ohms).

The voice frequency signal ($V_{XMT}$) that is to be transmitted to a central office via the TIP-RING is delivered to the amplifier 23, as shown.

A telephone line circuit in accordance with the invention can be constructed using discrete circuit components. Alternatively, the line circuit can be readily fabricated in integrated circuit form, except, of course, for the transformer. It is to be understood, therefore, that the foregoing disclosure relates to only a preferred embodiment of the invention and that numerous modifications or alterations may be made therein without departing from the spirit and scope of the invention.

What is claimed is:

1. A circuit comprising a transformer (12) having a primary winding (13) and a secondary winding (14), a low resistance (15) connected in series with the primary, means (17) coupled to said resistance for developing a direct current control voltage, means (23) responsive to said control voltage for causing a direct flow in said secondary which serves to substantially cancel the flux induced in the transformer core by any direct current flow in the primary, and means (31–36, 23) coupled across the primary winding for developing an alternating current control signal which is delivered to said secondary to create a predetermined alternating current termination impedance.

2. A telephone line circuit comprising a transformer (12) having a primary winding (13) and a secondary winding (14), a low resistance (15) connected in series with the primary, amplifier means (17) coupled to said resistance for developing a direct current control voltage, means (23) responsive to said control voltage for establishing a direct current flow in said secondary which is n times that of any direct current flow in said primary, where n is the transformer turns ratio, the direct current flow in said secondary being in a direction opposite that of any direct current flow in the primary, and means (31–36, 23) coupled across the primary winding for developing an alternating current control signal which is coupled to the secondary to create the proper alternating current termination impedance.

3. A telephone line circuit as defined in claim 2 including a resistance (25) connected in series with the secondary winding, and means (28, 29) coupling the voltage drop across the latter resistance to the input of the amplifier means.

4. A telephone line circuit as defined in claim 3 wherein the voltage drop across the latter resistance creates a null at the input of the amplifier means.

5. A telephone line circuit as defined in claim 4 wherein the direct current flow established in the secondary is 1.4 times that of any direct current flow in the primary.

6. A telephone line circuit as defined in claim 2 including a second resistance (25) connected in series with the secondary winding, a bridge circuit (18, 19, 28, 29), one side of said bridge circuit connecting a voltage drop across the first-recited resistance (15) to the input of the amplifier means, with the other side of said bridge circuit connecting a voltage drop across said second resistance to the input of the amplifier means, the amplifier means being connected across the mid-point of the bridge circuit, said second resistance being of a value such that the voltage drop across the same creates a null at the input of the amplifier means.

* * * * *